United States Patent [19]

Onder

[11] 4,098,775

[45] Jul. 4, 1978

[54] NOVEL POLYAMIDEIMIDES

[75] Inventor: Kemal B. Onder, North Haven, Conn.

[73] Assignee: The Upjohn Company, Kalamazoo, Mich.

[21] Appl. No.: 742,076

[22] Filed: Nov. 15, 1976

[51] Int. Cl.$^2$ .................................................. C08G 73/14
[52] U.S. Cl. ................................... 528/350; 260/30.2; 260/30.4 N; 260/30.8 R; 260/32.4; 260/32.6 N; 528/60; 528/64
[58] Field of Search ................ 260/47 CP, 65, 78 TF, 260/77.5 R

[56] References Cited

U.S. PATENT DOCUMENTS

| | | | |
|---|---|---|---|
| 3,260,691 | 7/1966 | Lavin et al. | 260/30.2 |
| 3,817,942 | 6/1974 | Kovacs et al. | 260/78 TF |

*Primary Examiner*—Lester L. Lee
*Attorney, Agent, or Firm*—James S. Rose; Denis A. Firth

[57] ABSTRACT

Polyamideimides are described which are derived by conventional procedures from particular 1,1-cycloaliphatic bis(phenylamine) compounds (or the corresponding diisocyanates) and trimellitic acid (preferably through the anhydride acid chloride). The polyamideimides are engineering thermoplastics characterized by the combined properties of solubility, melt processability, and resistance to thermal oxidation.

3 Claims, No Drawings

NOVEL POLYAMIDEIMIDES

BACKGROUND OF THE INVENTION

1. Field of the Invention

This invention relates to the preparation of polyamideimides and is particularly concerned with polyamideimides derived from 1,1-cycloaliphatic bis(phenylamine) compounds or the corresponding diisocyanates.

2. Description of the Prior Art

Polyamideimide polymers and particularly aromatic polyamideimides derived from trimellitic anhydride or its derivatives and various aromatic diamines (or corresponding diisocyanates) are well recognized in the polymer art as highly useful materials in such applications as wire coating, films, molded articles and the like.

U.S. Pat. No. 3,696,077 typically discloses a series of polyamideimides based on the trimellitic anhydride residue and the residue of at least one member of a particular class of aromatic diamines. The polymers obtained are characterized as soluble in phenolic solvents; however, they are not characterized as fusible to the extent that they are melt processable.

U.S. Pat. No. 3,748,304 discloses copolyamideimides which may be injection molded but which call for a mixture of aromatic diamines to be used. U.S. Pat. No. 3,803,100 discloses phenolic solvent soluble but infusible polyamideimides.

British Pat. No. 1,168,978 discloses soluble but infusible polyamideimides prepared, illustratively, from trimellitic anhydride and certain diisocyanates inclusive of aromatic diisocyanates. Soluble and fusible polyamideimides are disclosed where the diisocyanate employed is aliphatic.

The polyamideimides prepared in accordance with the present invention are aromatic polyamideimides which are characterized by having good solvent solubility and by being fusible and melt processable without the necessity of introducing comonomers into the polymer chain, i.e., without resorting to the formation of copolyamideimides.

Additionally, the polyamideimides of the present invention exhibit a high degree of resistance to oxidative degradation and this property, in conjunction with those already noted, serves to distinguish them over the polyamideimides of the prior art.

SUMMARY OF THE INVENTION

This invention comprises a solvent soluble fusible polyamideimide characterized by having in random arrangement the recurring units having the formulae

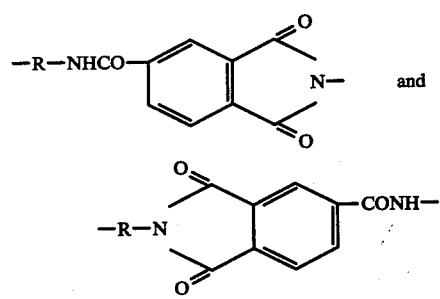

wherein R in each formula represents the divalent radical

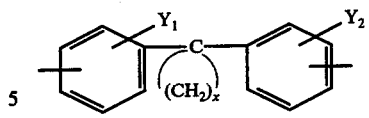

wherein $x$ has the value 4 or 5 and $Y_1$ and $Y_2$ are independently selected from the group consisting of hydrogen, alkyl having from 1 to 4 carbon atoms, and alkoxy having from 1 to 4 carbon atoms.

Alkyl from 1 to 4 carbon atoms means methyl, ethyl, propyl, butyl, and isomeric forms thereof.

Alkoxy from 1 to 4 carbon atoms means methoxy, ethoxy, propoxy, butoxy, and isomeric forms thereof.

The term "solvent" means an inert dipolar aprotic solvent such as dimethylsulfoxide, diethylsulfoxide, dimethylformamide, diethylformamide, dimethylacetamide, diethylacetamide, tetramethylurea, hexamethylphosphoramide, N-methylpyrrolidone, tetramethylenesulfone, and mixtures thereof.

DETAILED DESCRIPTION OF THE INVENTION

The polyamideimides of the invention having the random arrangement of the recurring units (I) and (II) set forth above are prepared by the reaction of a 1,1-cycloaliphatic bis(phenylamine) compound having the formula $$H_2N-R-NH_2 \qquad IV$$

or the corresponding diisocyanato compound (V) wherein R is defined as above, with substantially stoichiometric proportions of trimellitic acid, trimellitic anhydride or, in the case of the diamine (IV), preferably with an acid halide of the trimellitic anhydride. The reaction is carried out under conditions known in the art for the preparation of polyamideimides, see for example, U.S. Pat. Nos. 3,541,038, 3,696,077, and 3,748,304.

The novelty in the present invention resides in the choice of the diamines (IV) or corresponding diisocyanates (V) having the formula for R already referred to hereinabove wherein two phenylene residues are bonded to the same carbon atom of either a cyclopentylidene (III where $x = 4$), or cyclohexylidene (III where $x = 5$) residue and each phenylene nucleus may be further substituted by the group $Y_1$ or $Y_2$ which are as defined above.

In a preferred group of compounds (IV) or (V) which in turn provide for a preferred group of polyamideimides having the random arrangement of recurring units (I) and (II) set forth above, R represents the divalent radical

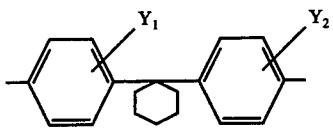

wherein the two phenylene nuclei have their valencies in the 1,4-positions and are both attached to a cyclohexane residue at the same carbon atom and each phenylene nucleus may be further substituted by the groups $Y_1$ and $Y_2$ defined as above.

Illustrative of the aromatic diamines (IV) [or the corresponding diisocyanates (V)] useful in the present invention are, 4,4'-diphenyl-1,1-cyclopentane diamine(4,4'-diphenyl-1,1-cyclopentane diisocyanate), 3,3'-diphenyl-1,1-cyclopentane diamine(3,3'-diphenyl-1,1-cyclopentane diisocyanate), 4,4'-di(o-tolyl)-1,1-cyclopentane diamine[4,4'-di(o-tolyl)-1,1-cyclopentane diisocyanate], 4,4'-di(o-methoxyphenyl-1,1-cyclopentane diamine[4,4'-di(o-methoxyphenyl)-1,1-cyclopentane diisocyanate], 3,3'-di(o-tolyl)-1,1-cyclopentane diamine[3,3'-di(o-tolyl)-1,1-cyclopentane diisocyanate], 4,4'-diphenyl-1,1-cyclohexane diamine(4,4'-diphenyl-1,1-cyclohexane diisocyanate), 3,3'-diphenyl-1,1-cyclohexane diamine(3,3'-diphenyl-1,1-cyclohexane diisocyanate), 4,4'-di(o-tolyl)-1,1-cyclohexane diamine[4,4'-di(o-tolyl)-1,1-cyclohexane diisocyanate], 4,4'-di(o-methoxyphenyl)-1,1-cyclohexane diamine[4,4'-di(o-methoxyphenyl)-1,1-cyclohexane diisocyanate], 3,3'-di(o-tolyl)-1,1-cyclohexane diamine[3,3'-di(o-tolyl)-1,1-cyclohexane diisocyanate], 4,4'-di(3-butylphenyl)-1,1-cyclohexane diamine[4,4'-(3-butyl-phenyl)-1,1-cyclohexane diisocyanate] 4,4'-di(3-butoxyphenyl)-1,1-cyclohexane diamine [4,4'-di(3-butoxyphenyl)-1,1-cyclohexane diisocyanate], and the like. A preferred group of the aromatic diamines (or corresponding diisocyanates thereof) is comprised of 4,4'-diphenyl-1,1-cyclohexane diamine(4,4'-diphenyl-1,1-cyclohexane diisocyanate), 4,4'-(o-tolyl)-1,1-cyclohexane diamine[4,4'-di(o-tolyl)-1,1-cyclohexane diisocyanate], 4,4'-di(o-methoxyphenyl)-1,1-cyclohexane diamine [4,4'-di(o-methoxyphenyl)-1,1-cyclohexane diisocyanate]. A particularly preferred diamine (or its corresponding diisocyanate) is 4,4'-diphenyl-1,1-cyclohexane diamine (4,4'-diphenyl-1,1-cyclohexane diisocyanate).

The diamines (IV) used as starting materials in the present invention can be prepared readily from cyclopentanone or cyclohexanone and the appropriate aromatic amine using procedures well known in the art and illustratively described in Chemical Abstracts 61, 14558 (1964).

Generally speaking, a 1.5 to 3.0 molar excess of the aromatic amine, over and above the 2:1 required stoichiometric ratio of aromatic amine to cycloaliphatic ketone, is mixed with the ketone and an amount of 32 percent hydrochloric acid equivalent to the proportion of amine and this solution is heated at 50° to 150° C for about 10 to 30 hours. The reaction solution is neutralized with aqueous sodium hydroxide, extracted with an organic solvent, typically chloroform, to isolate the product with the excess amine which is distilled off to yield crude diamine (IV) as a residue. Alternatively, the excess aromatic amine may be steam-distilled directly from the reaction mixture. The crude diamine is converted to its dihydrochloride salt by simply dissolving the diamine in dilute hydrochloric acid, and purified via recrystallization of the dihydrochloride from water. Neutralization of an aqueous solution of the purified dihydrochloride salt with aqueous sodium hydroxide provides the pure diamine (IV), generally speaking, as a crystalline compound.

The diamines (IV) are easily converted to their corresponding diisocyanates (V) by using phosgenation procedures well known to those skilled in the art for the preparation of isocyanates. Such typical methods are well described and summarized by by Siefken, Annalen, 562, 75 et seq., 1949.

Illustratively, where the diamine is employed, the latter is reacted with a substantially equimolar proportion of the acid halide, preferably the acid chloride, of trimellitic anhydride in the presence of a dipolar aprotic solvent such as dimethylformamide, dimethylacetamide, tetrahydrofuran, dioxan, acetonitrile, N-alkyl-2-pyrrolidones such as N-methyl- and N-ethyl-2-pyrrolidones, tetramethylene sulfone, tetramethylurea, and the like. The reaction is carried out advantageously at a temperature within the range of about −25° C to about 100° C and preferably at a temperature of about −20° C to about 25° C. Advantageously, the anhydride acid halide is added as a solid to the diamine solution.

Because of the greater reactivity of an acid chloride over an anhydride for reaction with an amine group, it is believed that a predominance of the polyamide acid recurring units resulting from the first stage of polymerization have the following formula

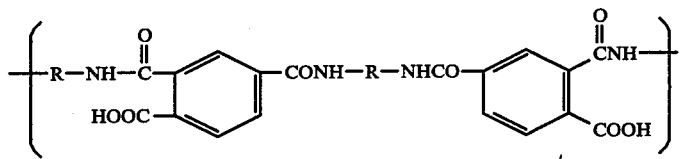

with a lesser amount of the polyamide acid consisting of recurring units having the formula

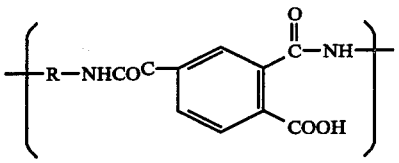

It is to be understood that the recurring units IV and VII are in random arrangement.

In the second stage of the reaction the polyamide acid, which is comprised of the randomized recurring units (VI) and (VII) formed in the first stage, is converted to the polyamideimide having the recurring units (I) and (II) set forth above. The polyamide acid may precipitate from its reaction mixture. Alternatively, it can be precipitated therefrom by addition of an appropriate liquid in which the polyamide acid is not soluble, and is isolated and subjected to cyclization to form the desired amide-imide. The cyclization is effected using any of the methods known in the art for converting polyamide acid intermediates to polyamide-imides. For example, cyclization is effected by heating the intermediate polyamide acid at a temperature of about 150° C to about 250° C under reduced pressure. The water eliminated in the cyclization is thereby removed on a continuous basis and the heating is continued until cyclization is complete.

The course of reaction in the aforesaid first and second steps can be followed readily using routine analytical procedures carried out on aliquots of the reaction mixture. Such routine techniques include infrared and nuclear magnetic resonance spectroscopy, and the like.

The polyamideimides of the invention can also be prepared in a single stage process by interaction of substantially stroichiometric proportions of the diisocyanates (V) and trimellitic acid or, preferably, the anhydride. The reaction is carried out in the presence of an inert dipolar aprotic solvent, such as those set forth above, at a temperature within the range of about 50° C to about 200° C and preferably at a temperature in the range of about 100° C to about 150° C. Advantageously, the reaction is carried out in the presence of a catalyst for the reaction of an isocyanate and a carboxylic acid and/or anhydride group. Such catalysts are well known in the art; see, for example, U.S. Pat. No. 3,701,756 and my copending applications Ser. Nos. 521,744 and 521,745 filed Nov. 7, 1974. Illustrative of such catalysts are the alkali metal salts of lactams such as sodium, potassium and lithium butyrolactamates, sodium, potassium and lithium valerolactamates, sodium, potassium and lithium caprolactamates, alkali metal alkoxides and aryloxides such as sodium, potassium and lithium methoxides, ethoxides, butoxides, and phenoxides, and the like.

The reaction between the diisocyanate and trimellitic acid or anhydride is carried out under substantially anhydrous conditions and the progress of the reaction can be followed by any of the routine analytical techniques such as those set forth above in regard to the reaction of the diamine with trimellitic acid or derivatives thereof. The polyamideimide produced by the reaction remains in solution and can be used as such or can be precipitated therefrom by addition of an appropriate liquid in which the polyamideimide is insoluble or has low solubility.

The polyamideimides of the invention are solid materials having a molecular weight, number average ($M_n$), within the range of about 8,000 to about 50,000 and a molecular weight, weight average (Mw), in the range of about 20,000 to about 250,000 and inherent viscosities in dimethylacetamide at 30° C and 0.5 percent concentration of the order of about 0.3 to about 1.5.

The polyamideimides are further characterized as solvent soluble in inert dipolar aprotic solvents which, illustratively, include those dipolar aprotic solvents listed hereinabove. The term "solvent soluble" means the polyamideimides are soluble to the extent of at least 5.0 percent by weight in said solvents.

Suprisingly, the polyamideimides are fusible, that is to say, they are capable of being molded and melt processed. This discovery is quite unexpected in view of the teaching of the prior art and particularly British Pat. No. 1,168,978. Thus, a standard Gehman Torsional Stiffness Test (in accordance with ASTM D-1053-58T) shows that polymers of the invention exhibit good melt flow properties as the temperature is increased above the glass transition temperature (Tg), that is to say, the modulus decreases through the rubbery region towards a value of $10^7$ dynes/cm$^2$. Contrastingly, polyamideimides prepared from a single aromatic diamine or single aromatic diisocyanate of the type heretofore described in the prior art with trimellitic anhydride do not exhibit similar behaviour in the Gehman test. For example, for the polyamideimide derived from 4,4'-methylenebis(-phenylisocyanate) and trimellitic anhydride the shear modulus increases above $10^7$ dynes/cm$^2$ above 300° C due to oxidative crosslinking. This type of behaviour, generally speaking, results in polymer degradation before any polymer melt characteristics (below $10^8$ dynes/cm$^2$) can be reached.

In yet a further unexpected result to flow from the polymers of the present invention, they exhibit an excellent resistance to oxidative degradation. For example, the polyamideimide prepared in accordance with the invention from the 4-acid chloride of trimellitic anhydride and 4,4'-diphenyl-1,1-cyclohexane diamine, is characterized by only a 0.2 percent weight loss when heated in air between 200° and 325° C. Contrastingly, the polyamideimide derived from the same acid chloride but using the 4,4'-diphenylmethane diamine is characterized by a 1 percent weight gain when heated in air to 300° C. Clearly, the methylene group between the two aromatic nuclei in the latter polyamideimide is susceptible to air oxidation. Polyamideimides of the present invention have, instead of a methylene group, a carbon atom which forms a member of the cycloaliphatic ring between the two aromatic nuclei. Accordingly, there are no hydrogens present in a similar situation to the methylene group.

The polyamideimides of the invention are engineering thermoplastics which can be employed in the fabrication, by molding, of a variety of articles which possess high structural strength and resistance to deformation or degradation at relatively high temperatures. Such articles include gears, ratchets, clutch linings, transmissions, conduits, bushings, pistons, piston rings, compressor vanes and impellers, thread guides, cams, brake linings, abrasive materials, electrical components, connectors, and under-the-hood automotive parts. Solutions of the polyamideimides are highly useful in the formation of films, fibers, coatings and the like. Particular utility resides in the formation of high temperature resistant wire coatings.

The following examples describe the manner and process of making and using the invention and set forth the best mode contemplated by the inventor of carrying out the invention but are not to be construed as limiting.

EXAMPLE 1

A 500 ml. resin flask fitted with a stirrer, nitrogen inlet, thermometer, and drying tube was thoroughly dried and charged with 26.6 g. (0.1 mole) of 4,4'-diphenyl-1,1-cyclohexane diamine (purified by recrystallization of its dihydrochloride salt from water) dissolved in 160 ml. of dry dimethylacetamide (distilled from calcium hydride). The solution was cooled to −15° C and, over a 10 minute period, 21.06 g. (0.1 mole) of powdered acid chloride of trimellitic anhydride was added to the stirred contents of the flask and the reaction temperature was not allowed to exceed 0° C. An additional 40 ml. of dimethylacetamide was used to rinse the glassware to ensure a quantitative transfer of the acid chloride to the flask.

The reaction temperature was allowed to rise to ambient and the solution was stirred overnight. An infrared scan of the solution showed the absence of anhydride absorption. Six and seven-tenths grams (15 percent calculated excess) of propylene oxide was added dropwise to the solution over a 15 minute period to scavenge hydrogen chloride while the temperature was kept below 30° C. The reaction solution was stirred for 3 hours. The resulting polymer solution was poured into deionized water whereupon the polyamide acid immediately precipitated as strands. After soaking for about 1 hour, the polymer strands were chopped in a Waring Blendor and the polymer powder collected by filtration, washed several times with deionized water, filtered and finally rinsed with isopropanol. The fine powdery polymer was converted to the polyamideimide by heating first at 180° C (under about 0.1 mm pressure) for 10 hours followed by a second heating step at 205° C (under about 0.1 mm pressure) for 2½ hours. Thus there was obtained a polyamideimide which had an ηinh at 30° C (0.5% in dimethylacetamide) = 0.42 and corresponded to the randomized recurring units I and II set forth above wherein R represented the divalent radical

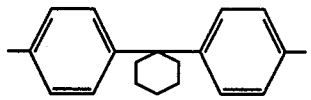

The thermogravimetric analysis of this polymer showed only a 0.2% weight loss when heated in air between 200° and 325° C whereas the corresponding polyamideimide prepared from trimellitic anhydride acid chloride and 4,4'-methylenedianiline exhibited a 1% weight gain when heated in air at 300° C.

The powdered polyamideimide, 7.5 g., was charged to a 2 inch diameter circular chrome plated steel mold, which had been preheated to 350° C, and was compression molded at 330° C and 5000 psi. The sample was demolded at 150° C to provide a clear transparent disk which was found to cut well.

From the disk a ¼ inch wide strip was cut and its shear modulus-temperature relationship determined using the test procedure of ASTM D 1053-58T and a Gehman Torsion Stiffness Tester fitted with a heavy duty furnace to allow operation up to 500° C. The Tg (glass transition) was determined by noting the temperature where the modulus of the sample was $10^9$ dynes/cm$^2$ and was 315° C. Its shear modulus curve showed good melt flow properties above 360° C indicating good injection moldability.

A 7 g. sample of the powdered polyamideimide was blended with 0.35 g. of TL 115 a fluorocarbon lubricant manufactured by LNP Corp., Thorndale, Pa. The blend was extruded through a Monsanto capillary rheometer through a 4:1 L/D ratio capillary die under 775 lbs. of force at 350° C to form a solid fused extrudate.

EXAMPLE 2 - 5

Using the same apparatus and procedure described in Example 1 and the ingredients and proportions set forth therein, except that the 4,4'-diphenyl-1,1-cyclohexane diamine is replaced by the equivalent amounts of the diamines set forth in Table I, there are produced the polyamideimides having the randomized recurring units I and II set forth above where R represents the various aromatic divalent radicals derived from the respective arylene diamines employed and are set forth in Table I.

TABLE I

| Arylene Diamine | —R— |
| --- | --- |
| Ex.2 4,4'-di(o-tolyl)-1,1-cyclohexane diamine | |
| Ex.3 4,4'-di(o-methoxyphenyl)-1,1-cyclohexane diamine | |
| Ex.4 3,3'-diphenyl-1,1-cyclohexane diamine | |
| Ex.5 4,4'-diphenyl-1,1-cyclopentane diamine | |

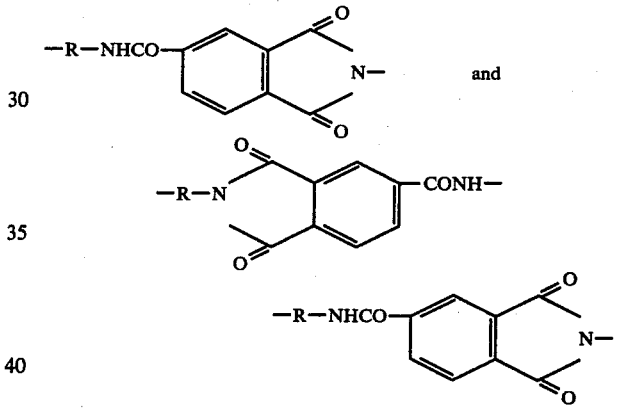

I claim:
1. A solvent soluble fusible polyamideimide characterized by having in random arrangement the recurring units having the formulae

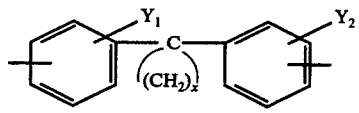

wherein R in each formula represents the divalent radical

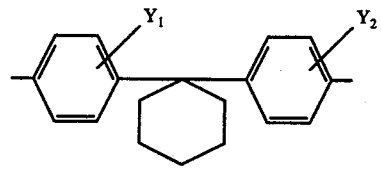

wherein $x$ has the value 4 or 5 and $Y_1$ and $Y_2$ are independently selected from the group consisting of hydrogen, alkyl having from 1 to 4 carbon atoms, and alkoxy having from 1 to 4 carbon atoms.

2. A solvent soluble fusible polyamideimide according to claim 1 wherein R in each formula represents the divalent radical wherein $Y_1$ and $Y_2$ are selected from the group consisting of hydrogen, alkyl having from 1 to 4 carbon atoms, and alkoxy having from 1 to 4 carbon atoms.

3. A solvent soluble fusible polyamideimide according to claim 2 wherein $Y_1$ and $Y_2$ are hydrogen.

* * * * *